(12) United States Patent
Wei et al.

(10) Patent No.: US 8,920,178 B2
(45) Date of Patent: Dec. 30, 2014

(54) ELECTRONIC APPARATUS ASSEMBLY

(75) Inventors: Chih-Sheng Wei, Taoyuan County (TW); Chin-Chung Shih, Taoyuan County (TW); Chih-Shan Yeh, Taoyuan County (TW); Yuan-Hung Chang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 138 days.

(21) Appl. No.: 13/309,536

(22) Filed: Dec. 1, 2011

(65) Prior Publication Data

US 2013/0143419 A1 Jun. 6, 2013

(51) Int. Cl.
*H01R 11/30* (2006.01)
*H05H 5/00* (2006.01)

(52) U.S. Cl.
USPC ........................................ 439/38; 361/679.41

(58) Field of Classification Search
USPC ........ 439/39, 38, 40, 305, 378, 118; 361/733, 361/679.41; 320/115; 381/394, 395
See application file for complete search history.

(56) References Cited

U.S. PATENT DOCUMENTS

| | | | | |
|---|---|---|---|---|
| 3,713,370 | A * | 1/1973 | Prijn | 396/197 |
| 5,812,356 | A * | 9/1998 | O'Connor | 361/179 |
| 7,097,461 | B2 * | 8/2006 | Neidlein | 439/66 |
| 7,311,526 | B2 | 12/2007 | Rohrbach et al. | |
| 7,329,128 | B1 * | 2/2008 | Awad | 439/38 |
| 7,471,511 | B2 * | 12/2008 | Montag et al. | 361/679.41 |
| 7,625,212 | B2 * | 12/2009 | Du | 439/39 |
| 7,719,830 | B2 * | 5/2010 | Howarth et al. | 361/679.41 |
| 2007/0072443 | A1 | 3/2007 | Rohrbach et al. | |
| 2007/0168593 | A1 | 7/2007 | Montag et al. | |
| 2009/0068948 | A1 | 3/2009 | Jubelirer | |
| 2009/0174990 | A1 * | 7/2009 | Ligtenberg et al. | 361/679.01 |
| 2012/0077352 | A1 * | 3/2012 | Weyer et al. | 439/39 |

FOREIGN PATENT DOCUMENTS

| | | |
|---|---|---|
| CN | 1568859 | 1/2005 |
| CN | 1972576 | 5/2007 |
| CN | 101075720 | 11/2007 |
| CN | 101740945 | 6/2010 |
| CN | 101904614 | 12/2010 |

(Continued)

OTHER PUBLICATIONS

"Office Action of China Counterpart Application", issued on Sep. 3, 2014, p1-p11, in which the references were cited.

(Continued)

*Primary Examiner* — Renee Luebke
*Assistant Examiner* — Harshad Patel
(74) *Attorney, Agent, or Firm* — Jianq Chyun IP Office

(57) ABSTRACT

An electronic apparatus assembly including an electronic apparatus and a detachable connector is provided. The electronic apparatus has a cavity, a first magnetic element and a set of first terminals. The first magnetic element and the set of first terminals are disposed in the cavity. The detachable connector has an inserting portion, a body portion, a second magnetic element and a set of second terminals. The inserting portion is adapted to be inserted into the cavity. The body portion is connected to the inserting portion. The second magnetic element and the set of second terminals are disposed on the inserting portion. When the inserting portion is inserted into the cavity, the first magnetic element and the second magnetic element are mutually attracted. The two sets of terminals are mutually contacted, and the body portion is adapted to be supported on a plane to stand the electronic apparatus on the plane.

19 Claims, 5 Drawing Sheets

(56) References Cited

FOREIGN PATENT DOCUMENTS

| | | |
|---|---|---|
| CN | 201877663 | 6/2011 |
| CN | 202034661 | 11/2011 |
| JP | 2003168485 | 6/2003 |
| TW | 200826394 | 6/2008 |
| TW | M351161 | 2/2009 |

OTHER PUBLICATIONS

"Office Action of Taiwan Counterpart Application", issued on May 20, 2014, p1-p7, in which the listed references were cited.

* cited by examiner

ELECTRONIC APPARATUS ASSEMBLY

BACKGROUND OF THE DISCLOSURE

1. Technical Field

The application generally relates to an electronic apparatus assembly, and more particularly, to an electronic apparatus assembly with a detachable connector.

2. Background

In recent years, handheld electronic devices, such as mobile phones, tablet PCs and eBooks, are popular on the market. The handheld electronic devices not only facilitate the people life, but also play an indispensable role in the daily life. The handheld electronic devices feature a compact size and a lighter mass for the convenience of users to hold the device in using and portably carry them.

Taking a mobile phone as an example, the user may connect a connector of a transformer to the mobile phone for charging it. In addition, the user may use a transmission line with both ends respectively having a connector, in which the connector at one end is plugged into the mobile phone, while the connector at the other end is plugged to an electronic apparatus for transmitting data between the mobile phone and the electronic apparatus or charging the mobile phone.

After the connector of the transformer or the transmission line is connected to the mobile phone, the mobile phone is placed on a plane. At the time, if a user needs to watch the image on the display of the mobile phone, the user must take up the mobile phone, which is inconvenient indeed.

SUMMARY

Accordingly, the application is directed to an electronic apparatus assembly with a detachable connector so as to make an electronic apparatus able to be stood on a plane.

The application provides an electronic apparatus assembly, which includes an electronic apparatus and a detachable connector. The electronic apparatus has a cavity, a first magnetic element and a set of first terminals. The first magnetic element and the set of first terminals are disposed in the cavity. The detachable connector has an inserting portion, a body portion, a second magnetic element and a set of second terminals, in which the inserting portion is suitable to be inserted into the cavity, the body portion is connected to the inserting portion, and the second magnetic element and the set of second terminals are disposed on the inserting portion. When the inserting portion is inserted into the cavity, the first magnetic element and the second magnetic element are mutually attracted, the set of first terminals and the set of second terminals are mutually contacted and the body portion is suitable to be supported on a plane to stand the electronic apparatus on the plane.

Based on the description above, in the electronic apparatus assembly of the disclosure, after the inserting portion of the detachable connector is inserted into the cavity of the electronic apparatus, the first magnetic element of the electronic apparatus and the second magnetic element of the detachable connector are mutually attracted in which the body portion of the detachable connector is supported on the plane so as to stand the electronic apparatus on the plane.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DETAILED DESCRIPTION

Figure 1A:
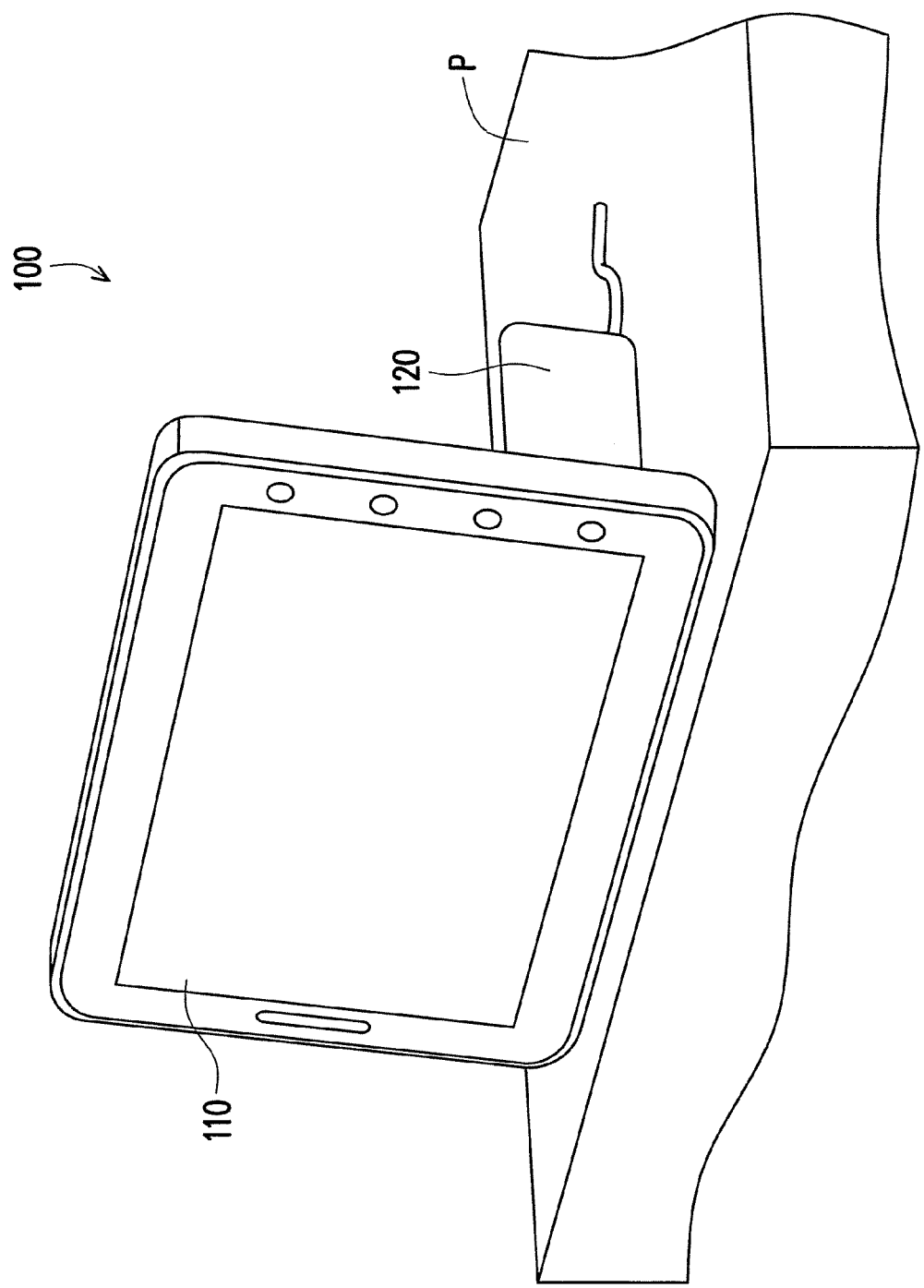
FIG. 1A is an assembled view of an electronic apparatus assembly according to an embodiment of the invention.
Figure 1B:
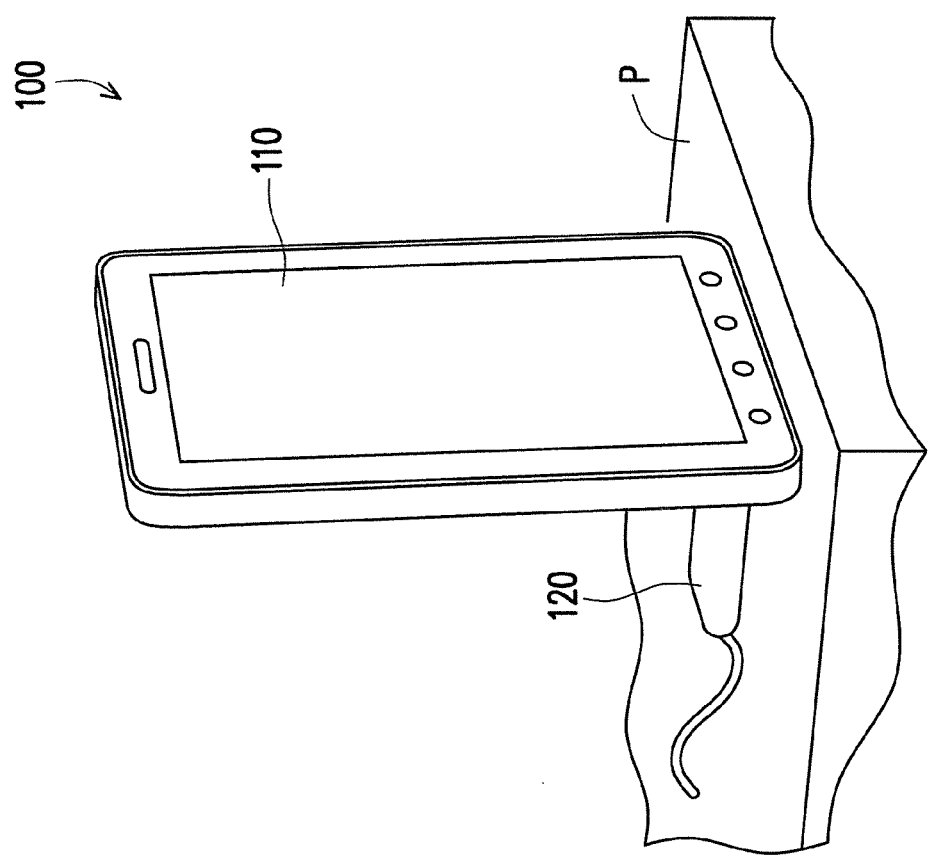
FIG. 1B is an assembled view of the electronic apparatus assembly of FIG. 1A from another angle of view.
Figure 2:
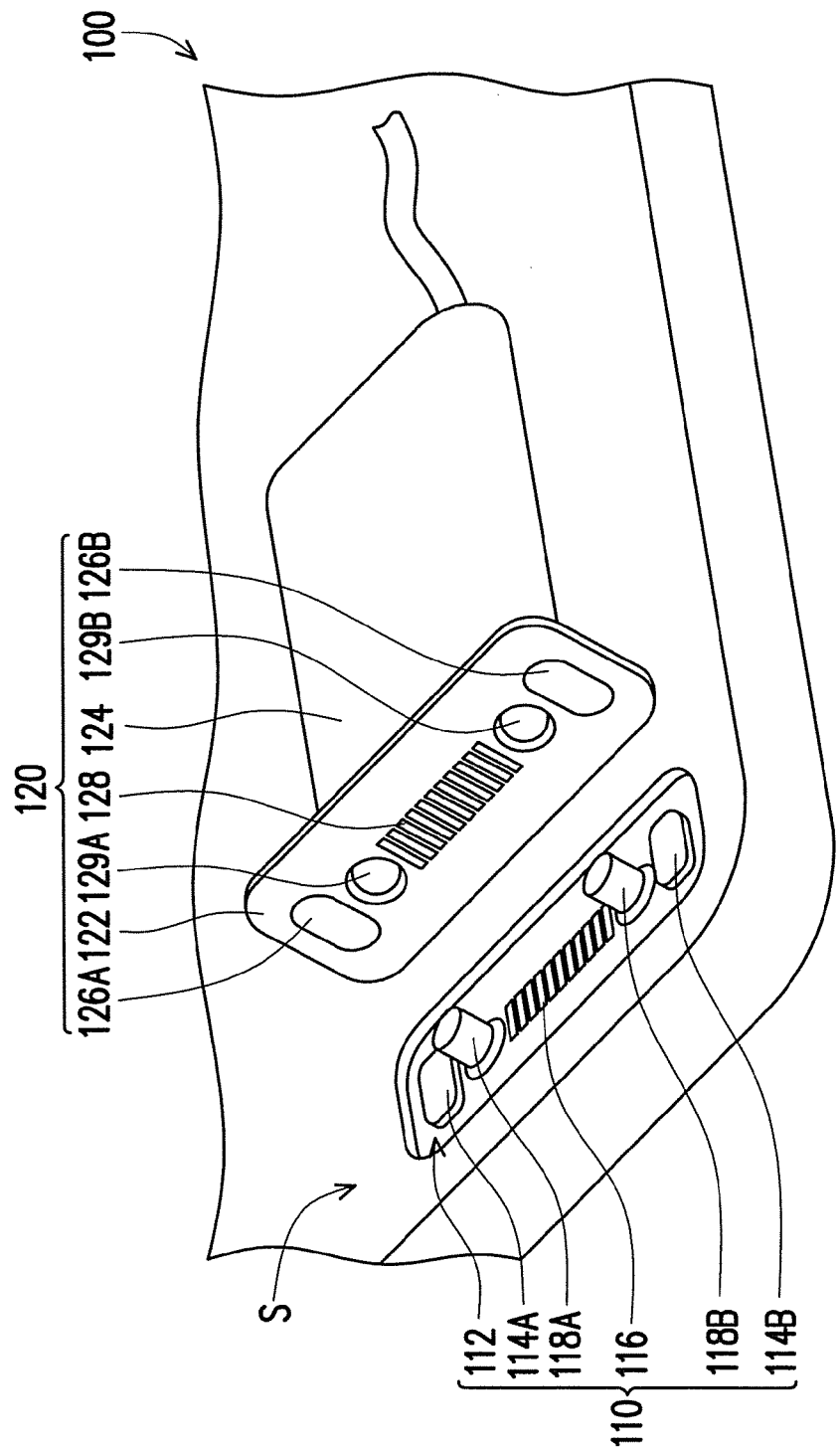
FIG. 2 is a partial enlarged view of the electronic apparatus assembly and the detachable connector in FIG. 1A from another angle of view.

FIG. 1A is an assembled view of an electronic apparatus assembly according to an embodiment of the invention, FIG. 1B is an assembled view of the electronic apparatus assembly of FIG. 1A from another angle of view and FIG. 2 is a partial enlarged view of the electronic apparatus assembly and the detachable connector in FIG. 1A from another angle of view. Referring to FIGS. 1A, 1B and 2, in the embodiment, an electronic apparatus assembly 100 includes an electronic apparatus 110 and a detachable connector 120. The electronic apparatus 110 has a cavity 112, a first magnetic element 114A and a set of first terminals 116. The first magnetic element 114A and the set of first terminals 116 are disposed in the cavity 112. The detachable connector 120 has an inserting portion 122, a body portion 124, a second magnetic element 126A and a set of second terminals 128.

The inserting portion 122 is suitable to be inserted into the cavity 112, the body portion 124 is connected to the inserting portion 122, and the second magnetic element 126A and the set of second terminals 128 are disposed on the inserting portion 122. When the inserting portion 122 is inserted into the cavity 112, the first magnetic element 114A and the second magnetic element 126A are mutually attracted, in which the first magnetic element 114A may be a magnetizing element or a magnetized element, while the second magnetic element 126A is corresponding to the first magnetic element 114A to be a magnetized element or a magnetizing element. In other words, the first magnetic element 114A and the second magnetic element 126A have opposite polarities to mutually attract. The set of first terminals 116 and the set of second terminals 128 are mutually contacted and the body portion 124 is suitable to be supported on a plane P so as to stand the electronic apparatus 110 on the plane P.

After the inserting portion 122 of the detachable connector 120 is inserted into the cavity 112 of the electronic apparatus 110 by a user, the first magnetic element 114A and the second magnetic element 126A are mutually attracted so that the inserting portion 122 couples with the cavity 112, which further makes the body portion 124 supported on the plane P (for example, on a table) and the detachable connector 120 may support the electronic apparatus 110. In this way, the electronic apparatus 110 may be stood on the plane P in portrait mode (as shown by FIG. 1A) or in landscape mode (as shown by FIG. 1B), which facilitates the user to watch the images on the display of the electronic apparatus 110. In addition, since the set of first terminals 116 and the set of second terminals 128 are mutually contacted, the electronic apparatus 110 may be electrically connected to the detachable connector 120 for the electronic apparatus 110 and another electronic apparatus (not shown) to transmit data therebetween or charging the electronic apparatus 110.

Figure 3:
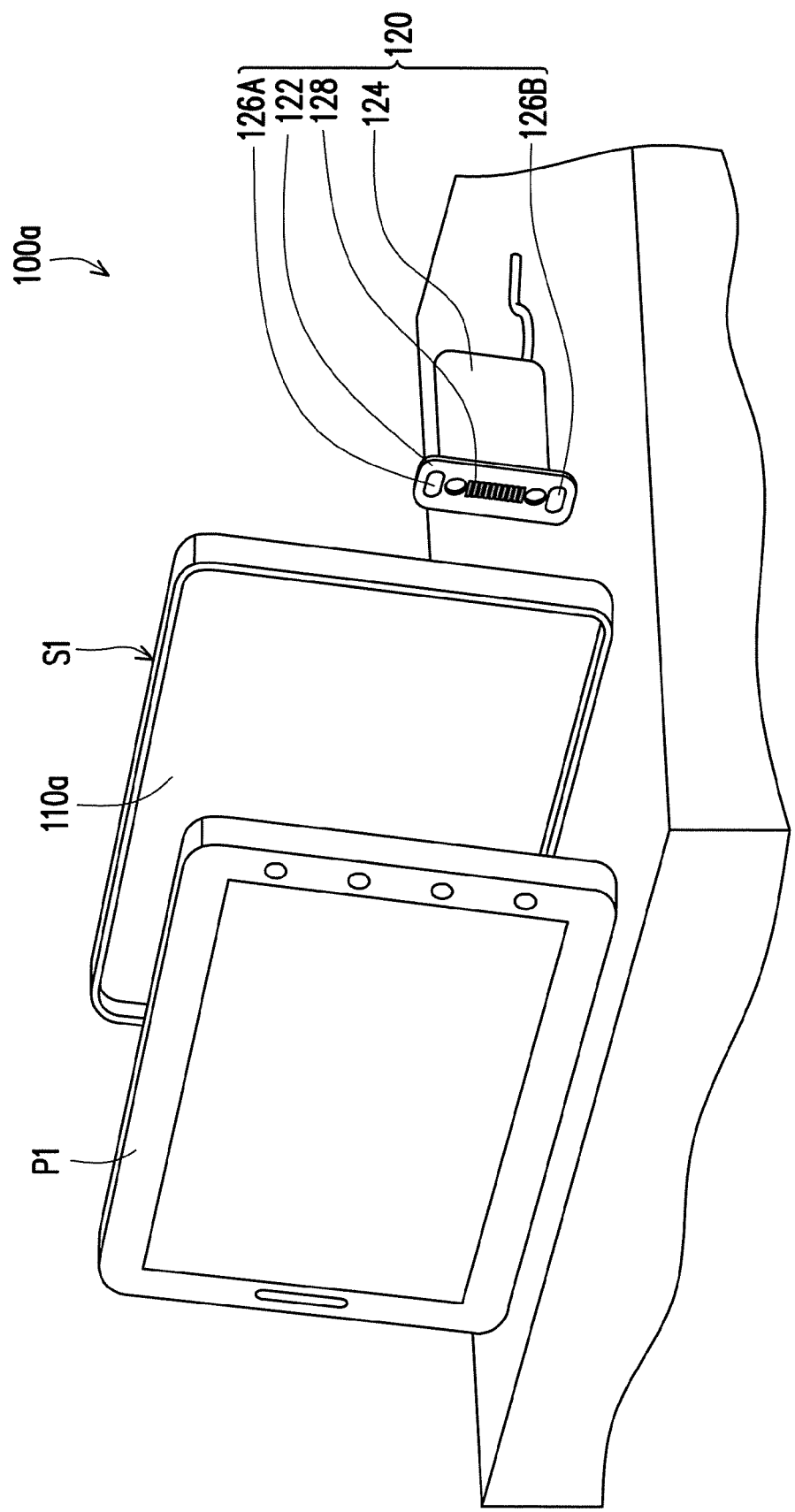
FIG. 3 is an exploded view of the electronic apparatus assembly of FIG. 1.

FIG. 3 is an exploded view of the electronic apparatus assembly of FIG. 1. Referring to FIGS. 1A and 3, the electronic apparatus assembly 100a of FIG. 3 is similar to the electronic apparatus assembly 100 of FIG. 1, and in following, only the difference thereof is described, in which the same numbers represent the same as or similar to the above-mentioned embodiment, while the same depictions are omitted. The electronic apparatus 110 of FIG. 1A is a handheld electronic device, but the electronic apparatus 110A of FIG. 3 is a frame and suitable to allow a handheld electronic device P1 assembled on the frame. The handheld electronic device of FIG. 1A and the handheld electronic device P1 of FIG. 3 are, for example, a mobile phone, a tablet PC and an eBook. In addition, the cavity 112 of FIG. 1A (shown in FIG. 2) is formed on a backside S of the handheld electronic device (shown in FIG. 2), while the cavity 112 of FIG. 3 (shown in FIG. 2) is formed on a backside S1 of the frame.

In other words, the detachable connector 120 of FIG. 1A is directly assembled to the handheld electronic device, and the detachable connector 120 of FIG. 3 may be assembled to the handheld electronic device P1 through the frame. In addition, after the handheld electronic device P1 of FIG. 3 is assembled to the frame, the handheld electronic device may be electrically connected to the frame in wireless transmission mode or wired transmission mode.

Referring to FIG. 2, in order to enhance the connection between the detachable connector 120 and the electronic apparatus 110 so as to avoid the set of second terminals 128 of the detachable connector 120 separating from the set of first terminals 116 of the electronic apparatus 110 and thereby interrupting the signal transmission, the electronic apparatus 110 of the embodiment may include a pair of first magnetic elements 114A and 114B and the detachable connector 120 may include a pair of second magnetic elements 126A and 126B. The pair of first magnetic elements 114A and 114B and the pair of second magnetic elements 126A and 126B is mutually attracted to increase the connection between the detachable connector 120 and the electronic apparatus 110. In addition, the profile of the cavity 112 may be symmetric shape and the profile of the inserting portion 122 consists with the profile of the cavity 112, and the first magnetic element 114A is disposed at a position other than the profile of the cavity 112. In this way, the connection between the detachable connector 120 and the electronic apparatus 110 is increased.

The set of first terminals 116 is located between the first magnetic elements 114A and 114B and the set of second terminals 128 is located between the second magnetic elements 126A and 126B, which can increase the distance between the two first magnetic elements 114A and 114B and the distance between the two second magnetic elements 126A and 126B so as to further increase the connection between detachable connector 120 and the electronic apparatus 110.

The electronic apparatus 110 of the embodiment may have a first positioning portion 118A and the detachable connector 120 may have a second positioning portion 129A. The first positioning portion 118A is disposed in the cavity 112 and the second positioning portion 129A is disposed on the inserting portion 122. When the inserting portion 122 is inserted into the cavity 112 by the user, the first positioning portion 118A is coupled to the second positioning portion 129A, in which the first positioning portion 118A is a post or a hole, and the second positioning portion 129A is corresponding to the first positioning portion 118A to be a hole or a post. In this way, the connection between the detachable connector 120 and the electronic apparatus 110 is enhanced. In addition, the profile of the cavity 112 may be symmetric shape and the profile of the inserting portion 122 consists with the profile of the cavity 112, and the first positioning portion 118A is disposed at a position other than the profile centroid of the cavity 112. In this way, the connection between the detachable connector 120 and the electronic apparatus 110 is enhanced.

The electronic apparatus 110 may include a pair of first positioning elements 118A and 118B and the detachable connector 120 may include a pair of second positioning elements 129A and 129B. The pair of first positioning elements 118A and 118B respectively is coupled to the pair of second positioning elements 129A and 129B. Moreover, the set of first terminals 116 is located between the pair of first positioning elements 118A and 118B and the set of second terminals 128 is located between the pair of second positioning elements 129A and 129B, so that the distance between the two first positioning elements 118A and 118E and the distance between the second positioning elements 129A and 129B are increased, which may further enhance the connection between the detachable connector 120 and the electronic apparatus 110.

Figure 4B:
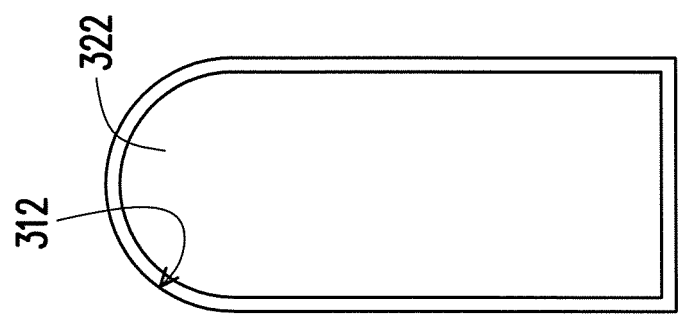
FIG. 4B is an assembled view of a cavity and a inserting portion according to yet another embodiment of the invention.
Figure 4A:
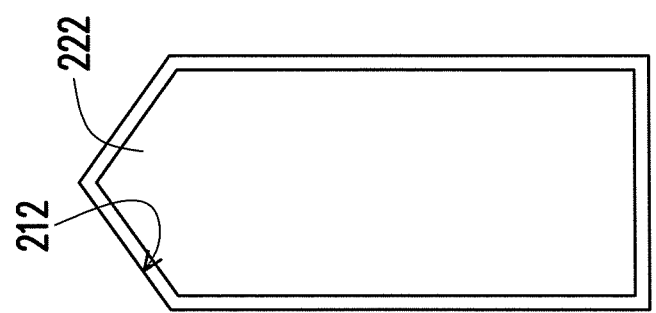
FIG. 4A is an assembled view of a cavity and an inserting portion according to another embodiment of the invention.

In consideration of a fool proof design required for the user to assemble the electronic apparatus 110 and the detachable connector 120 so as to avoid the situation that the set of first terminals 116 may not correctly contact the set of second terminals 128, other two embodiments are disclosed. FIG. 4A is an assembled view of a cavity and a inserting portion according to another embodiment of the disclosure and FIG. 4B is an assembled view of a cavity and a inserting portion according to yet another embodiment of the disclosure. Referring to FIGS. 4A and 4B, in the embodiment, the profiles of the cavities 212 and 312 may be asymmetric shape and the profiles of the inserting portions 222 and 322 conform to the profiles of the cavities 212 and 312. In other words, an end of the inserting portion 222 of FIG. 4A is in triangle shape and another end of the inserting portion 222 of FIG. 4A is in rectangular shape; an end of the inserting portion 322 of FIG. 4B is in semicircular shape and another end of the inserting portion 322 of FIG. 4B is in rectangular shape. In this way, when the user assembles the electronic apparatus 110 (shown in FIG. 2) and the detachable connector 120 (shown in FIG. 2), the fool proof design through the combination of the two profiles of the cavity and the inserting portion may avoid the above-mentioned situation. It should be noted that the profile shapes of the cavity and the inserting portion in FIGS. 4A and 4B are examples only, which the disclosure is not limited to.

Referring to FIG. 2 again, the two first magnetic elements 114A and 114B of the embodiment are respectively a magnetizing element and a magnetized element. The two second magnetic elements 126A and 126B, corresponding to the two first magnetic elements 114A and 114B, are a magnetized element and a magnetizing element. By using the configuration of two opposite polarities, the fool proof design for assembling the electronic apparatus 110 and the detachable connector 120 is also implemented.

In yet another unshown embodiment, the two first positioning portions may be posts and holes, and the two second positioning portions are corresponding to the two first positioning portions to be holes and posts, in which by an opposite layout of the posts and the holes, the fool proof design for assembling the electronic apparatus 110 and the detachable connector 120 is also implemented. The user may, according to the application practice, select one of the schemes that by using the profile shape matches between the cavity and the inserting portion, by using the opposite polarities between the two first magnetic elements and the two second magnetic elements and by using the locking structures between the two first positioning portions and the two second positioning portions, or by using a combination of the above-mentioned schemes to implement the fool proof design for assembling the electronic apparatus 110 and the detachable connector 120.

In summary, in the electronic apparatus assembly of the present application, when the inserting portion is inserted into the cavity by the user, the first magnetic element and the second magnetic element are mutually attracted, and the inserting portion and the cavity are combined with each other to make the body portion supported on the plane. In this way, the detachable connector may support the electronic apparatus and the electronic apparatus may be stood on the plane, which is convenient for the user to watch the data of the electronic apparatus without taking up the electronic apparatus. Meanwhile, the set of first terminals and the set of second terminals are mutually contacted for transmitting data between the electronic apparatus and another electronic apparatus or charging the electronic apparatus. In addition, when the pair of first magnetic elements and the pair of second magnetic elements are used, or the pair of first positioning portions and the pair of second positioning portions are used, or the two matching profiles of the cavity and the inserting portion are used, the connection between the detachable connector and the electronic apparatus is increased, or the above-mentioned schemes may be used to implement a fool proof design for assembling the electronic apparatus and the detachable connector.

It will be apparent to those skilled in the art that the descriptions above are several preferred embodiments of the disclosure only, which does not limit the implementing range of the disclosure. Various modifications and variations may be made to the structure of the disclosure without departing from the scope or spirit of the disclosure. The claim scope of the disclosure is defined by the claims hereinafter.

What is claimed is:

1. An electronic apparatus assembly, comprising:
   an electronic apparatus having a cavity, a first magnetic element and a set of first terminals, wherein the first magnetic element and the set of first terminals are disposed in the cavity; and
   a detachable connector having an inserting portion, a body portion, a second magnetic element, a cable and a set of second terminals, wherein the inserting portion is suitable to be inserted into the cavity, the body portion is connected securely to the inserting portion and the body portion is immovable relative to the insertion portion, the second magnetic element and the set of second terminals are disposed on the inserting portion, and the detachable connector is used to connect to the electronic apparatus and another electronic apparatus to transmit data therebetween or charging the electronic apparatus, and the body portion is connected to the another electronic apparatus by the cable,
   wherein when the inserting portion is inserted into the cavity, the first magnetic element and the second magnetic element are mutually attracted, the set of first terminals and the set of second terminals are mutually contacted and the body portion is configured to be supported on a plane to stand the electronic apparatus on the plane in a portrait mode or in a landscape mode,
   wherein the body portion has an end portion located distant from the inserting portion, and the electronic apparatus further has an edge in contact with the plane, when the electronic apparatus is stood on the plane, the end portion of the body portion and the edge of the electronic apparatus are coplanar along the plane, such that the body portion and the electronic apparatus are both in contact with the plane.

2. The electronic apparatus assembly as claimed in claim 1, wherein the electronic apparatus is a frame, the frame is suitable to allow a handheld electronic device assembled thereon and the cavity is formed on a backside of the frame.

3. The electronic apparatus assembly as claimed in claim 1, wherein the electronic apparatus is a handheld electronic device and the cavity is formed on a backside of the handheld electronic device.

4. The electronic apparatus assembly as claimed in claim 1, wherein the electronic apparatus further has a first positioning portion, the detachable connector further has a second positioning portion, the first positioning portion is disposed in the cavity, the second positioning portion is disposed on the inserting portion, and when the inserting portion is inserted into the cavity, the first positioning portion is coupled to the second positioning portion.

5. The electronic apparatus assembly as claimed in claim 4, wherein the first positioning portion is a post or a hole, and the second positioning portion is corresponding to the first positioning portion to be a hole or a post.

6. The electronic apparatus assembly as claimed in claim 5, wherein the electronic apparatus comprises a pair of the first positioning portions and the detachable connector comprises a pair of the second positioning portions, the pair of first positioning portions are coupled to the pair of second positioning portions respectively.

7. The electronic apparatus assembly as claimed in claim 6, wherein the set of first terminals is located between the pair of first positioning portions and the set of second terminals is located between the pair of second positioning portions.

8. The electronic apparatus assembly as claimed in claim 4, wherein the profile of the cavity is a symmetric shape, the profile of the inserting portion consists with the profile of the cavity and the first positioning portion is disposed at a position other than the profile centroid of the cavity.

9. The electronic apparatus assembly as claimed in claim 1, wherein the electronic apparatus comprises a pair of the first magnetic elements and the detachable connector comprises a pair of the second magnetic elements.

10. The electronic apparatus assembly as claimed in claim 9, wherein the set of first terminals is located between the pair of first magnetic elements and the set of second terminals is located between the pair of second magnetic elements.

11. The electronic apparatus assembly as claimed in claim 1, wherein the profile of the cavity is an asymmetric shape and the profile of the inserting portion consists with the profile of the cavity.

12. The electronic apparatus assembly as claimed in claim 1, wherein the profile of the cavity is a symmetric shape, the profile of the inserting portion consists with the profile of the cavity and the first magnetic portion is disposed at a position other than the profile centroid of the cavity.

13. An electronic apparatus assembly, comprising:
   an electronic apparatus having a cavity, a pair of first magnetic elements and a set of first terminals, wherein the pair of first magnetic elements and the set of first terminals are disposed in the cavity, and the set of first terminals is located between the pair of first magnetic elements; and
   a detachable connector directly assembled to the electronic apparatus, and having an inserting portion, a body portion, a pair of second magnetic elements, a cable and a set of second terminals, wherein the inserting portion is suitable to be inserted into the cavity, the body portion is connected securely to the inserting portion and the body portion is immovable relative to the insertion portion, and the pair of second magnetic elements and the set of second terminals are disposed on the inserting portion, the set of second terminals is located between the pair of second magnetic elements, and the detachable connector is used to connect to the electronic apparatus and another electronic apparatus to transmit data therebetween or charging the electronic apparatus, and the body portion is connected to the another electronic apparatus by the cable, wherein when the inserting portion is inserted into the cavity, the pair of first magnetic elements and the pair of second magnetic elements are mutually attracted, the set of first terminals and the set of second terminals are mutually contacted through the pairs of first and second magnetic elements being mutually attracted, so that the body portion is configured to be supported on a plane to stand the electronic apparatus on the plane in a portrait mode or in a landscape mode, wherein the body portion has an end portion located distant from the inserting portion, and the electronic apparatus further has an edge in contact with the plane, when the electronic apparatus is stood on the plane, the end portion of the body portion and the edge of the electronic apparatus are coplanar along the plane, such that the body portion and the electronic apparatus are both in contact with the plane.

14. The electronic apparatus assembly as claimed in claim 13, wherein the electronic apparatus is a frame, the frame is suitable to allow a handheld electronic device assembled thereon and the cavity is formed on a backside of the frame.

15. The electronic apparatus assembly as claimed in claim 13, wherein the electronic apparatus is a handheld electronic device and the cavity is formed on a backside of the handheld electronic device.

16. The electronic apparatus assembly as claimed in claim 13, wherein the electronic apparatus further has a first positioning portion, the detachable connector further has a second positioning portion, the first positioning portion is disposed in the cavity, the second positioning portion is disposed on the inserting portion, and when the inserting portion is inserted into the cavity, the first positioning portion is coupled to the second positioning portion.

17. The electronic apparatus assembly as claimed in claim 16, wherein the first positioning portion is a post or a hole, and the second positioning portion is corresponding to the first positioning portion to be a hole or a post.

18. The electronic apparatus assembly as claimed in claim 17, wherein the electronic apparatus comprises a pair of the first positioning portions and the detachable connector comprises a pair of the second positioning portions, the pair of first positioning portions are coupled to the pair of second positioning portions respectively.

19. The electronic apparatus assembly as claimed in claim 18, wherein the set of first terminals is located between the pair of first positioning portions and the set of second terminals is located between the pair of second positioning portions.

* * * * *